July 9, 1946.   J. P. TARBOX   2,403,881
METALLIC STRUCTURE
Filed Feb. 16, 1944
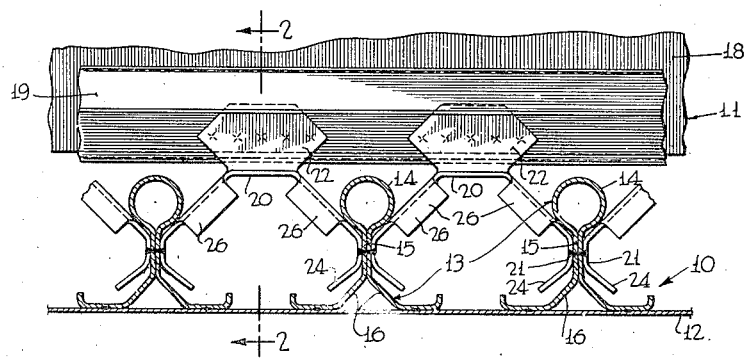
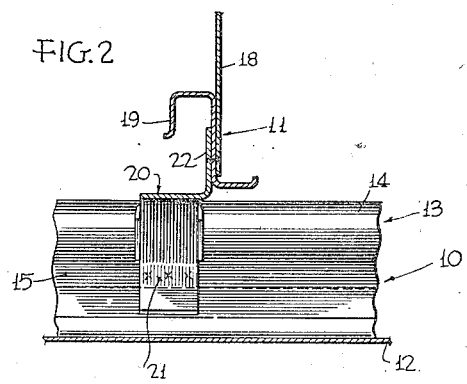
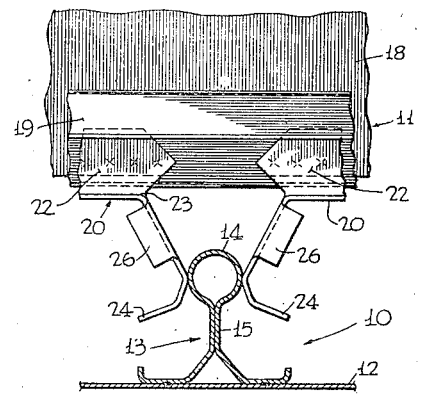
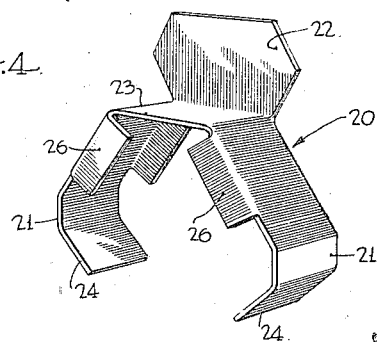
INVENTOR Patented July 9, 1946

2,403,881

UNITED STATES PATENT OFFICE 2,403,881

METALLIC STRUCTURE

John P. Tarbox, Philadelphia, Pa., assignor to Edward G. Budd Manufacturing Company, Philadelphia, Pa., a corporation of Pennsylvania Application February 16, 1944, Serial No. 522,683

10 Claims. (Cl. 189—34)

This invention relates to metallic structures and their manufacture and has for an object the provision of improvements in this art.

In the manufacture of sheathed metal structures, particularly sheathed structures which have a thin covering or skin as of sheet metal, it is common to strengthen and stiffen the skin sheet with stringers, thus forming a rigidified outer covering which may be termed the skin blanket; and then to secure this skin blanket to transverse chord members of an interior frame or rib structure. Considerable difficulty has been experienced in attaching the skin blanket to the transverse chords due to lack of access for welding or riveting tools, which are necessarily quite bulky because they must provide a clamping action of considerable magnitude.

It has been proposed to use gusset-like clips for attaching the skin blanket to the frame, and these clips have assumed a variety of forms. Usually they have been of the type which is first attached to the skin sheet and later attached to the frame.

The present invention provides an attaching clip which is particularly adapted to be attached to the frame before it is attached to the skin blanket, although it can be first attached to the skin blanket if desired.

One type of stringer which is used in forming the skin blanket has an overhanging outer edge consisting of lateral flanges or a bulb on a stem or web which is perpendicular to the skin sheet. Connecting clips are desirably attached to the web, inasmuch as this provides the best point of anchorage to the skin blanket. If the clips are to be first attached to the skin blanket, they may be in some cases introduced over the ends of the stringers when they are so formed as to embrace both sides of the web; and may be introduced from the side when they are so formed as to engage only one side of the web. But if such clips, which attach to the web around the stringer overhang, are first attached to the frame, it is difficult if not impossible to bring the skin blanket into position relative to the frame because the stringer overhang will not pass the overhanging ends of the clips.

According to the present invention, the clips are made yieldable to permit them, when attached to the frame, to be pushed past the overhang of the stringers; and thereafter their overhanging ends are attached to the sides of the stringer webs.

The clips form a triangulated system, being inclined at an angle between the stringer webs and the rib chords, to strengthen the airfoil assembly. The disposition of the attaching means relative to the web and chord is also such that the attaching means are loaded principally in shear, thus availing of their greatest strength. This is particularly important for welded connections.

The objects and advantages of the invention may best be understood from the following description of an exemplary embodiment thereof, reference being made to the accompanying drawing, wherein:

Fig. 1 is a chordwise section of a half-shell airfoil assembly embodying the invention;

Fig. 2 is a section taken on the line 2—2 of Fig. 1;

Fig. 3 is a small detail section similar to Fig. 1 showing a stage in the assembly of stringer and clips; and Fig. 4 is a perspective view of one of the clips alone.

The construction illustrated herein comprises a skin blanket 10 and a frame 11. The skin blanket includes a skin sheet 12 and stringers 13, the stringers having overhanging outer portions 14, webs 15, and a Y-shaped flanged base 16. The overhanging portion of the stringers may be of various sectional shape and is here shown as being bulb-shaped. The full stringer section may be described as of flanged-Y-bulb shape and is sometimes referred to as a "little man" section. The frame 11 includes a rib plate 18 and a rib chord 19, the chord here being of Z-shape. The rib plate is adapted to be connected to a similar rib plate of another airfoil half-shell to form the complete airfoil. The half-shells are fully accessible from the inside in a direction normal to the skin sheet up until the time when the half-shells are secured together.

The skin blanket is secured to the rib chords by clips 20, which clips comprise wings 21 secured to the stringer webs 15 and base wings or ears 22 at right angles thereto which are secured to the vertical webs of the chords 19. The preferred method of attachment is by resistance welding when the parts are formed of such a material, for example, as cold-rolled stainless steel.

The wings 21 are flexible at the base 23, where they are connected to the ears 22, and are provided at their outer ends with curved flanges 24 to assist the action of pushing the wings past the overhanging portions of the stringers, as shown in Fig. 3. The inclined portions 25 of the wings are strengthened and stiffened by lateral flaps 26 at each end.

In the embodiment illustrated, the wings of the clips are arranged in pairs and extend at an angle away from each other, the spacing being such that the wings fit properly between two adjacent stringers; but if the stringers are not spaced regularly, the wings may be arranged in other ways on the base ears, either in pairs to embrace opposite sides of a single stringer, or singly to fit against one side of a stringer.

From the above description and by a comparison of Figs. 1 and 4, it will be seen that when the rib chords, bearing the clips, and the skin blanket are moved toward each other, the flexible wings of the clips snap past the overhanging portions of the stringers and into a position where they may be welded to the sides of the stringer webs. If too much force is required to push the wings past the stringer overhang, the wings may be held together by any suitable means while the parts are being assembled.

This construction has a number of advantages, among them being:

The permissible attachment of the clips to the rib chords before their attachment to the stringers, thus permitting the stringers to be engaged by the clips at any point along their length.

The triangulated system of clips affords an extremely strong construction constituting with the rib chords or cap strips and the skin blankets a transverse truss of great stiffness though not of great vertical depth.

The assembly of the airfoil is greatly facilitated and simplified, the jigging being less complicated and the welding being more accessible and more efficiently carried out. A very simple form of portable welder may be used, as for example, one with fore-shortened and very rigid arms which are required simply to reach over the outer overhang of the stringers to weld the wings of the clips to the stringer webs; the welding of the clips to the rib chords is done while the parts are completely unobstructed.

The portion of the curved flanges 24 which fits against the web of a stringer is shorter than the width of the web thus allowing adjustment of the skin blanket relative to a rib.

It will be obvious that the clips have features which make them useful for stringers without overhang, in which case they need not necessarily be resilient.

While one embodiment has been described, it is to be understood that the invention may have various embodiments within the limits of the prior art and the scope of the subjoined claims.

What is claimed is:

1. In a metallic structure, in combination, a skin blanket element including a skin sheet and reinforcing stringers having portions which laterally overhang the sides of a base-connecting web, a frame element including chord members disposed transversely of the stringers and having a side wall directed toward the blanket, and connecting clips each having angularly disposed wings secured to the chord wall and to a stringer web respectively and having a flexible intermediate portion adapted to be bent to permit the passage of parts when the skin and frame elements are assembled.

2. In a metallic structure, in combination, a skin blanket element including a skin sheet and reinforcing stringers having portions which laterally overhang the sides of a base-connecting web, a frame element including chord members disposed transversely of the stringers and having a side wall directed toward the blanket, and connecting clips each having angularly disposed wings secured to the chord wall and to a stringer web respectively and having a flexible intermediate portion adapted to be bent to permit the passage of parts when the skin and frame elements are assembled, the intermediate portion of the clip being disposed at an angle between the web and the chord.

3. In a metallic structure, in combination, a skin blanket element including a skin sheet and reinforcing stringers having portions which laterally overhang the sides of a base-connecting web, a frame element including chord members disposed transversely of the stringers and having a side wall directed toward the blanket, and connecting clips each having angularly disposed wings secured to the chord wall and to a stringer web respectively and having a flexible intermediate portion adapted to be bent to permit the passage of parts when the skin and frame elements are assembled, the intermediate portion of the clip being disposed at an angle between the web and chord with the flexible part adjacent the chord and with stiffened portions therebeyond.

4. In a metallic structure, in combination, a skin blanket element including a skin sheet and reinforcing stringers having portions which laterally overhang the sides of a base-connecting web, a frame element including chord members disposed transversely of the stringers and having a side wall directed toward the blanket, and connecting clips each having angularly disposed wings secured to the chord wall and to a stringer web respectively and having a flexible intermediate portion adapted to be bent to permit the passage of parts when the skin and frame elements are assembled, the intermediate portion of the clip being flexible adjacent the chord and stiffened by a bent flange therebeyond.

5. In a metallic structure, in combination, a skin blanket element including a skin sheet and reinforcing stringers having portions which laterally overhang the sides of a base-connecting web, a frame element including chord members disposed transversely of the stringers and having a side wall directed toward the blanket, and connecting clips each having angularly disposed wings secured to the chord wall and to a stringer web respectively and having a flexible intermediate portion adapted to be bent to permit the passage of parts when the skin and frame elements are assembled, said clips each having two web-attaching wings extending from the chord-attaching wing.

6. In a metallic structure, in combination, a skin blanket element including a skin sheet and reinforcing stringers having portions which laterally overhang the sides of a base-connecting web, a frame element including chord members disposed transversely of the stringers and having a side wall directed toward the blanket, and connecting clips each having angularly disposed wings secured to the chord wall and to a stringer web respectively and having a flexible intermediate portion adapted to be bent to permit the passage of parts when the skin and frame elements are assembled, said clips each having two oppositely inclined web-attaching wings extending from the chord-attaching wing to adapt them for connection to the webs of two adjacent stringers.

7. In a metallic structure, in combination, a skin blanket element including a skin sheet and reinforcing stringers having portions which laterally overhang the sides of a base-connecting web, a frame element including chord members disposed transversely of the stringers and having a side wall directed toward the blanket, and connecting clips each having angularly disposed wings secured to the chord wall and to a stringer web respectively and having a flexible intermediate portion adapted to be bent to permit the passage of parts when the skin and frame elements are assembled, said clips each having reversely bent tips on the web-attaching wings to cause them to be flexed by passage of the stringer-overhangs.

8. In a metallic structure, in combination, a skin blanket element including a skin sheet and reinforcing stringers having webs extending away from the skin, a frame element including chord members disposed transversely of the stringers and having a side wall directed toward the blanket, and connecting clips each having angularly disposed wings secured to the chord wall and to a stringer web respectively, the web-engaging wing being formed as a bent sheet attached at one edge to the other wing and having a web-engaging portion which is shorter than the width of the web to allow adjustment between frame and blanket.

9. In a metallic structure, in combination, a skin blanket element including a skin sheet and reinforcing stringers having webs extending away from the skin, a frame element including chord members disposed transversely of the stringers and having a side wall directed toward the blanket, and connecting clips each having angularly disposed wings secured to the chord wall and to a stringer web respectively, the web-engaging wing being formed as a bent sheet attached at one edge to the other wing and having side-bent stiffening flanges at each side edge.

10. In a metallic structure, in combination, a skin blanket element including a skin sheet and reinforcing stringers having webs extending away from the skin, a frame element including chord members disposed transversely of the stringers and having a side wall directed toward the blanket, and connecting clips each having angularly disposed wings secured to the chord wall and to a stringer web respectively, the web-engaging wing being formed as a bent sheet attached at one edge to the other wing and being inclined at an angle between its ends.

JOHN P. TARBOX.